May 14, 1968   V. K. ELORANTA   3,382,788
PHOTOGRAPHIC APPARATUS

Original Filed April 8, 1964   5 Sheets-Sheet 2

INVENTOR.
Vaito K. Eloranta
BY Brown and Mikulka
Robert E. Corb
ATTORNEYS

May 14, 1968 V. K. ELORANTA 3,382,788
PHOTOGRAPHIC APPARATUS
Original Filed April 8, 1964 5 Sheets-Sheet 3

INVENTOR
Vaito K. Eloranta
BY
ATTORNEYS

May 14, 1968  V. K. ELORANTA  3,382,788
PHOTOGRAPHIC APPARATUS

Original Filed April 8, 1964  5 Sheets-Sheet 4

INVENTOR
Vaito K. Eloranta
BY Brown and Mikulka
Robert E. Corb
ATTORNEYS

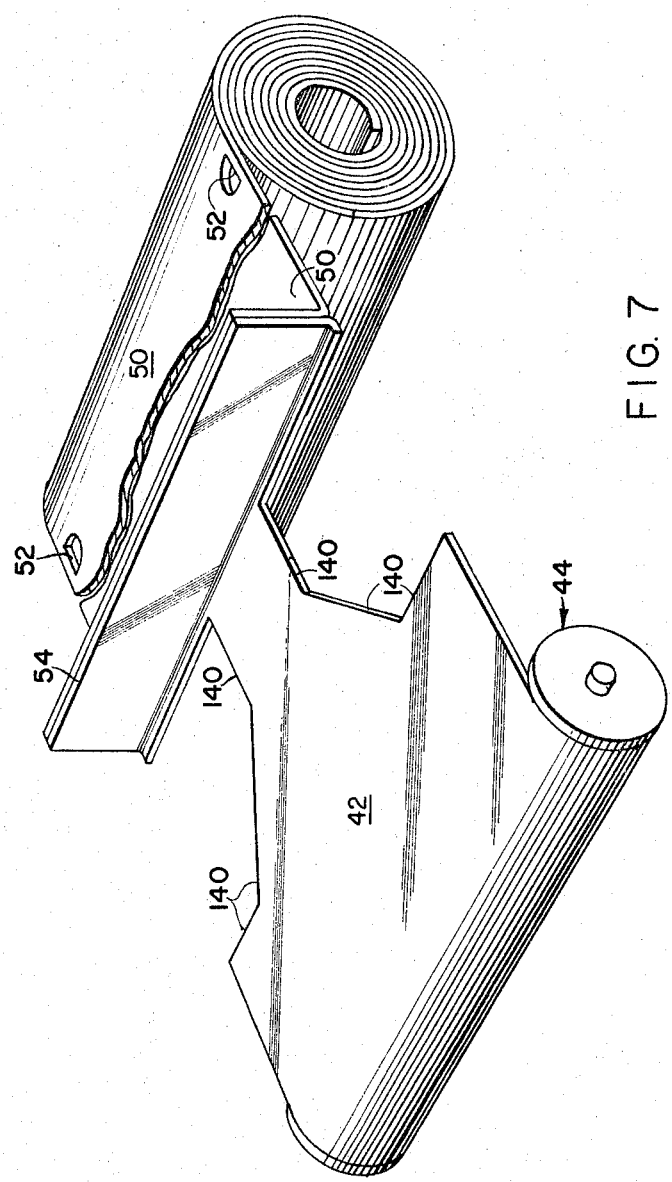

United States Patent Office 3,382,788
Patented May 14, 1968

3,382,788
PHOTOGRAPHIC APPARATUS
Vaito K. Eloranta, Needham, Mass., assignor to Polaroid Corporation, Cambridge, Mass., a corporation of Delaware
Continuation of application Ser. No. 358,269, Apr. 8, 1964. This application Sept. 20, 1965, Ser. No. 488,356
32 Claims. (Cl. 95—89)

This application is a continuation of copending application Ser. No. 358,269, now abandoned, filed Apr. 8, 1964.

This invention relates to photographic apparatus and particularly to novel and improved cameras for exposing successive areas of a photosensitive sheet and processing the exposed areas by superposing them with a second sheet and distributing a liquid processing composition between the sheets.

Cameras of this type are constructed for use with a roll film assemblage comprising an elongated photosensitive image-recording sheet, a second or image-receiving sheet and a plurality of rupturable containers of processing liquid mounted on the second sheet. The two sheets are coupled at their leading ends and are processed by moving the sheets in superposition between two juxtaposed pressure-applying members to distribute the processing liquid between the sheets to form a sandwich. The camera includes, in addition to the pressure-applying members, a housing comprising two relatively movable sections, for mounting exposure means such as a lens and shutter assembly and locating successive areas of the photosensitive sheet in position for exposure; means for retaining the two housing sections in operative relation; means for controlling the movement of the sheets through the camera; means for supporting the pressure-applying members in juxtaposition and biasing them toward one another; and means for severing successive portions of the sandwich (each including an exposed area of the photosensitive sheet) as they are withdrawn from the camera between the pressure-applying members.

Objects of the invention are: to provide in a camera of the type described, novel and improved indexing means controlling the movement of the sheets through the camera by engaging successive portions of one of the sheets; and to provide means as described including a pressure-applying member in the form of a roll, indexing means including an engagement member for engaging successive portions of one of the sheets to arrest movement of the sheets, mounted for rotation coaxially with the roll, and means for controlling the rotation of the engagement member so as to permit and arrest movement of the sheets.

Other objects of the invention are: to provide, in a camera as described, a device including said pressure-applying members, said indexing means, means for biasing said pressure-applying members toward one another, and means for retaining the sections of the camera housing in operative relation; and to provide a device as described comprising substantially all of the operative components of the camera except the means for exposure, characterized by a simplified and inexpensive, compact construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 7 is a perspective view of a roll film assemblage of the type employed in the camera.

Figure 1:
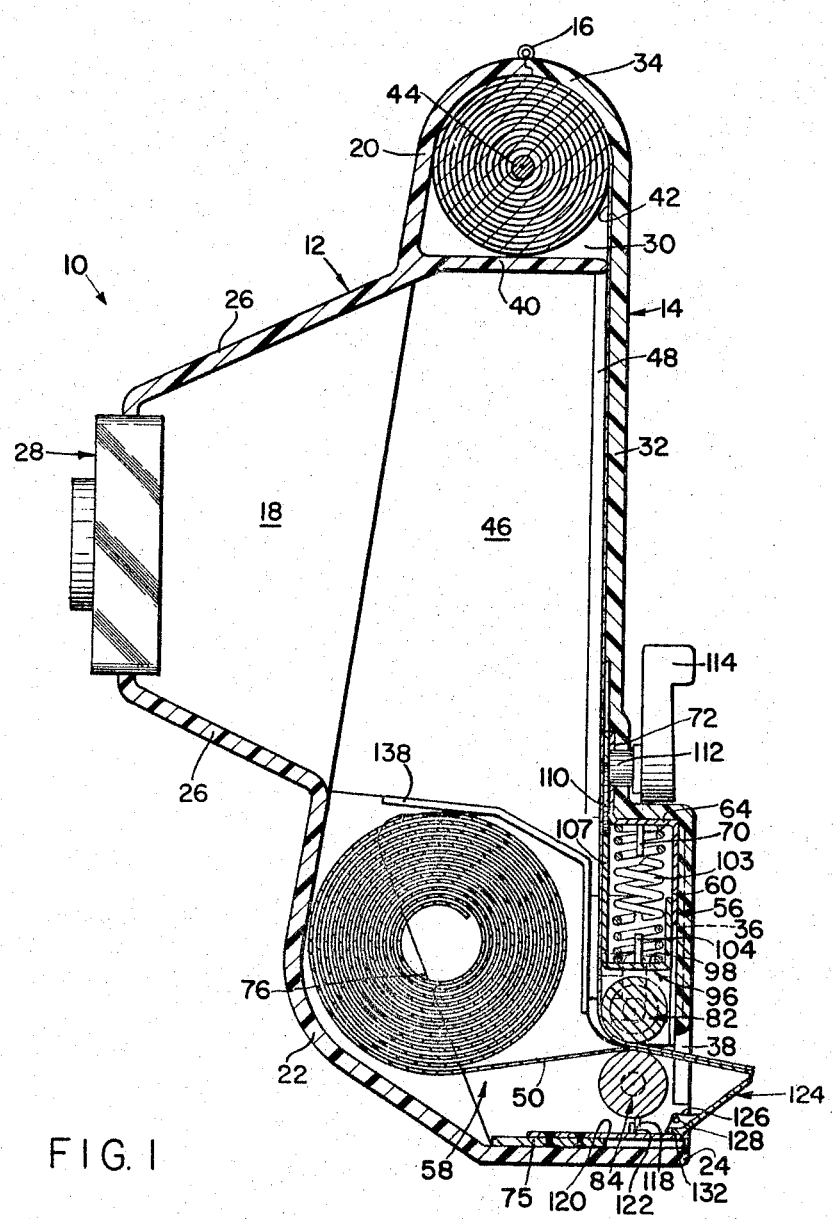
FIGURE 1 is a sectional view of a camera embodying the fluid distributing and indexing device of the invention, the section being taken substantially midway between the sides of the camera.

Reference is now made to FIGURE 1 of the drawings in which there is illustrated a camera 10 including a housing having a forward section 12 and a rear section 14 coupled with one another for pivotal movement with respect to one another by a hinge 16 located at one end of the camera housing. The forward housing section includes side walls 18 and a forward wall including a first end portion 20 at which the forward housing section is coupled with the rear housing section, a second end portion 22 at the opposite end of the camera housing, a rear portion 24, and forwardly projecting sections 26 cooperating with the side walls for mounting a conventional lens and shutter assembly 28 and providing a chamber for transmitting light from the lens and shutter assembly toward the rear of the camera housing. Rear housing section 14 includes side walls 30 having forward edge portions which cooperate with the rear edge portions of side walls 18 to provide a substantially light-tight juncture; and a rear wall including a substantially planar rear portion 32, first end portion 34 at which the rear housing section is pivotably coupled with the forward housing section, and a second end portion 36 near the opposite end of the camera housing and projecting rearwardly beyond rear portion 32. Rear portion 24 and second end portion 36 cooperate with one another to define the sides of an opening 38 at the rear of and adjacent one end of the camera housing and through which successive portions of a sandwich comprising the photosensitive and second sheets are withdrawn from the camera housing.

The forward housing section includes an inner upper wall 40 cooperating with first end portions 20 and 34 and side walls 18 and 30 to provide a chamber for holding a supply of a photosensitive image-recording sheet, designated 42 (shown in greater detail in FIG. 7), coiled around a spool 44. The forward housing section also includes inner side walls 46 extending rearwardly toward rear portion 32 and including tracks 48 for locating and supporting successive areas of image-recording sheet 42 in position for exposure to light from lens and shutter assembly 28.

The two sections of the camera housing are pivotable with respect to one another about hinge 16 between the closed or operative position shown in FIGURE 1, and an open or inoperative position to permit loading of a film assemblage of the type shown in FIG. 7, into the camera housing. The film assemblage comprises, in addition to an image-recording sheet 42 coiled about a spool 44, a second or image-receiving sheet 50 which is coiled upon itself. The photosensitive sheet may comprise a layer or layers of any of the photosensitive materials, such as silver halide, commonly used in photography, carried on a support sheet which is opaque or includes a strata opaque to light actinic to the photosensitive material.

The image-receiving sheet is substantially equal in width to the image-recording sheet and, in the preferred form, is adapted to provide a support for image-forming substances transferred by diffusion from the image-recording sheet. Image-receiving sheet 50 is also opaque or includes a strata opaque to light actinic to the photosensitive material of the image-recording sheet; mounts a succession of rupturable containers of processing liquid, each container being associated with areas of the image-receiving sheet adapted to be superposed with an area of the image-recording sheet; and a succession of D-shaped openings 52 formed in one or both lateral margins, each opening or pair thereof being associated with one of the aforementioned succession of areas of the image-receiving sheet. The image-recording and image-receiving sheets are connected to one another at their leading ends and joined with a leader 54 so that when successive portions of the two sheets are moved into superposition between a pair of pressure-applying members, each exposed area of the image-recording sheet will be properly registered with a corresponding area of the image-receiving sheet, with the rupturable container associated therewith properly positioned for dispensing its contents between the superposed areas of the two sheets. Leader 54 facilitates loading of the camera and advancement of the first pair of areas of the sheets between the pressure-applying members while D-shaped openings 52 in the image-receiving sheet provide means which may be engaged by the indexing means of the camera for properly controlling and arresting the movement of the sheets through the camera.

The camera housing is designed to be fabricated by mass production methods and of inexpensive materials, for example, by molding organic plastic materials. The processing and indexing device of the camera includes components located on opposite sides of the sheets and acting in combination and in opposition to one another upon the sheets located between them. Accordingly, components of the processing and indexing mechanisms which act upon the sheets in opposition to one another are mounted on different sections of the camera housing to permit and facilitate loading of the roll film assemblage into the camera housing with portions of the sheets extending between the various components of the mechanism. The accuracy with which these components are required to be located with respect to one another and the forces exerted by these components upon themselves and the sheets are substantially greater than the accuracy obtainable in a two-section camera housing formed of organic plastic materials by molding processes, and the forces exerted by and upon the components of these mechanisms are substantially greater than an inexpensive molded plastic housing is able to withstand. Accordingly, the fluid processing and indexing means are combined in a unitary device including two sections which are separable by pivoting the housing sections with respect to one another and which may be joined to one another to operatively locate the various components with the requisite accuracy in a unitary device which prevents undue stresses from being applied to the camera housing.

Figure 2:
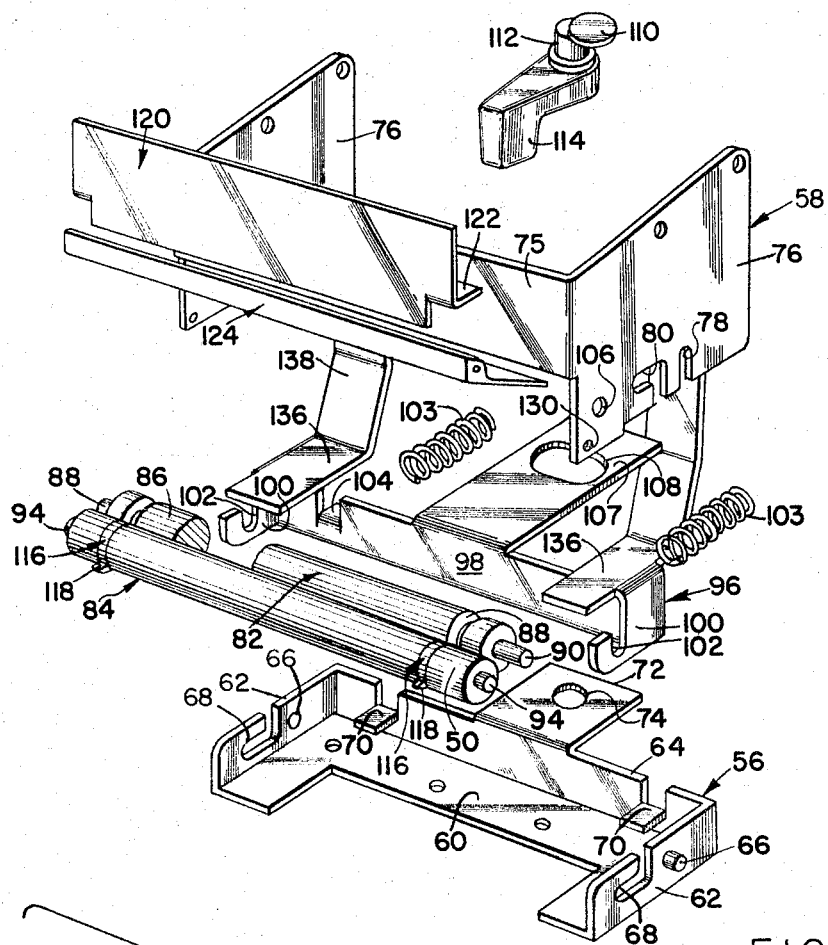
FIG. 2 is an exploded, perspective view of the embodiment of the device shown in FIG. 1.
Figure 4:
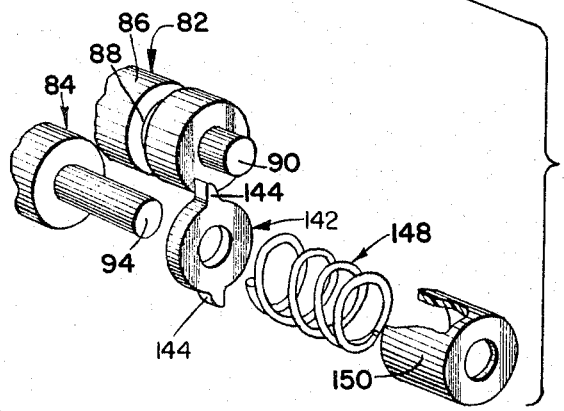
FIG. 4 is an exploded fragmentary perspective view of a portion of the device of FIG. 3.
Figure 3:
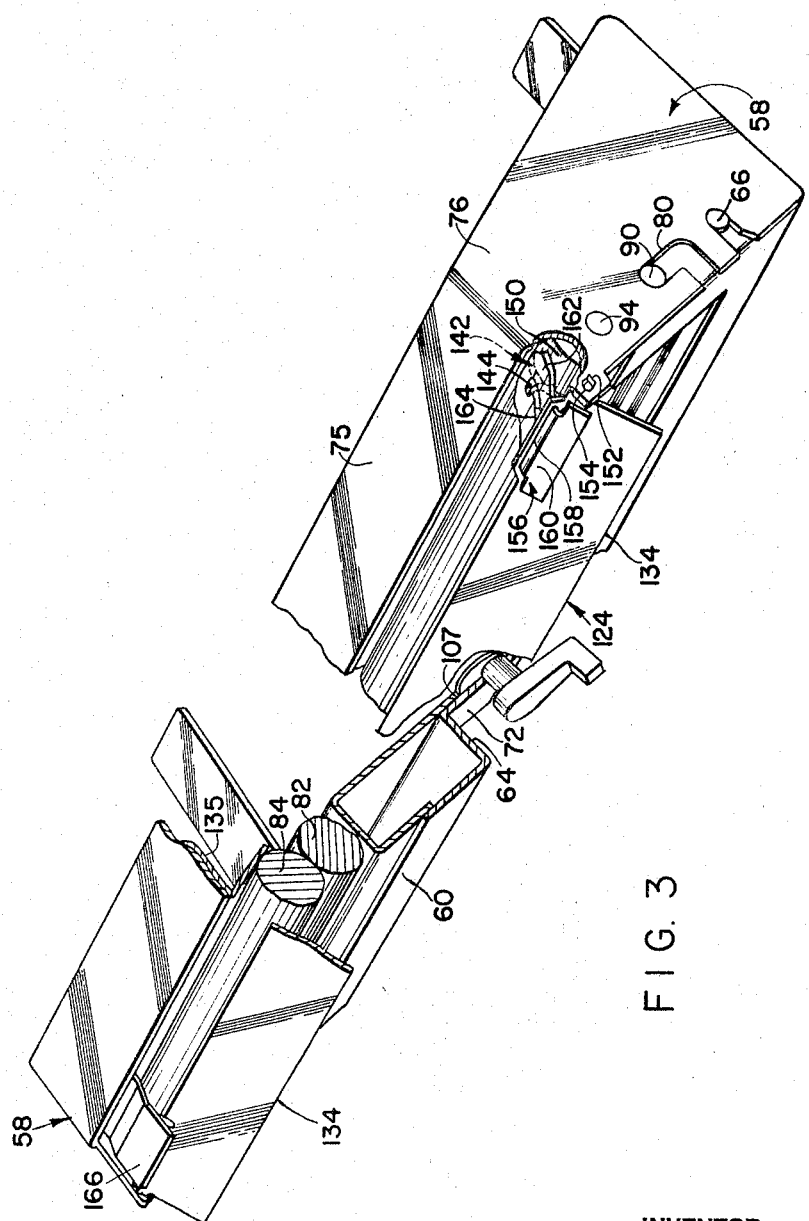
FIG. 3 is a perspective view, partially in section, of a modified embodiment of device shown in FIGS. 1 and 2.

This unitary device, including the processing and indexing means as well as a latch for retaining the housing sections in their closed or operative position, is shown in FIGS. 1 and 2 as comprising a first support member 56 mounted on second end portion 36 of the rear housing section and a second support member 58 mounted within the forward housing section on second end portion 22. The first and second support members are preferably formed of sheet metal and function to support the processing, indexing and latch means of the camera.

First support member 56 comprises a U-shaped base 60 at which member 56 is mounted on second end portion 58, two side walls 62 and an upstanding transverse wall 64. Side walls 62 are spaced apart from one another by a distance exceeding the width of sheets 42 and 50 and are provided with outwardly projecting pins 66 and formed with L-shaped slots 68 extending rearwardly toward base 60 and then parallel with the base away from transverse wall 64. Transverse wall 64 is formed with two tabs 70 extending generally perpendicularly from wall 64 and parallel with base 60; and is provided with a member 72 extending in the opposite direction in a plane generally parallel with base 60 and perpendicular to the transverse wall. Member 72 is formed with a round opening 74 adjacent its free end.

Second support member 58 includes a transverse section 75 disposed adjacent second end portion 22 of the forward housing section and side sections 76 located adjacent side walls 18 of the forward housing section of the camera. Side sections 76 of second support member 58 include slots 78 adapted to receive pins 66 for locating the first and second support members with respect to one another when the housing sections are in their operative position; and L-shaped slots 80 extending forwardly and then toward transverse section 75 and aligned with slots 68 when the housing sections are in operative position.

The processing mechanism of the camera includes a pair of pressure-applying members in the form of rolls 82 and 84 mounted, respectively, on first support member 56 and second support member 58 in closing relation (across) opening 38. Roll 82 includes a generally cylindrical intermediate section 86 having a length approximately equal to the width of the photosensitive and image-receiving sheets and formed with circumferential grooves 88 adjacent its ends; and stub shafts 90 at the ends of the roll providing means for mounting roll 82 for rotation. Roll 84 includes a generally cylindrical intermediate section 92 having a length approximately equal to the distance between grooves 88; and shafts 94 extending from the ends of the intermediate section.

Means are provided on first support member 56 for mounting roll 82 for rotation and biasing the roll toward roll 84 when the housing sections are in operative position. These last-mentioned means include a mounting member 96 formed of sheet metal and including a transverse section 98 and end sections 100 disposed in planes perpendicular to the plane of transverse section 98. Mounting member 96 is constructed to fit between side walls 62 of first support member 56 with transverse section 98 located in a plane parallel with transverse wall 64 and with end sections 100 disposed closely adjacent and parallel with side walls 62. Roll 82 is mounted for rotation in mounting member 96, and for this purpose, a pair of slots 102 are formed in end sections 100 for receiving stub shafts 90 or bushings in which the stub shafts are journaled. First support member 56, mounting member 96 and roll 82 are constructed so that when they are assembled, stub shafts 90 of roll 82 are engaged in slots 68 in side walls 62 of first support member 56 thereby retaining the assembly of the first support member, mounting member 96 and roll 82 together in operative relation. Coil springs 103 are provided engaged between transverse wall 64 and transverse section 98 for biasing mounting member 96, and roll 82 mounted thereon, away from transverse wall 64 and toward roll 84 in the operative position of the camera housing sections. Springs 103 are engaged around tabs 70 and similar tabs 104 formed from transverse section 98, and function to bias stub shafts 90 into slots 68 toward the dead ends of the slots, effectively preventing disassembly of the assembly described. The construction of slots 68 also facilitates assembly of the device and limits movement of roll 82 with respect to support member 56 and roll 84.

Roll 84 is mounted for rotation in a fixed position on second support member 58 and for this purpose holes 106 are provided in side sections 76 for receiving stub shafts 94 of roll 84 or bushings in which the stub shafts are journaled. Side sections 76 of second support member 58 are spaced apart from one another so as to fit outside of side walls 62 when the housing sections are in operative position and in this position pins 66 projecting outwardly from side wall 62 are engaged in slots 78 in side sections 76 thereby positioning the first and second support members with respect to one another and in effect coupling the two support members so that the forces exerted by springs 103 through roll 82 against roll 84 are taken up by the support members and are not exerted upon the camera housing. It is by virtue of this construction that the camera housing can be made of inexpensive materials, e.g., plastics, and by molding processes, since the housing sections are not required to locate the pressure-applying members with respect to one another and are not subjected to mechanical stresses.

The mechanism shown and described, including first and second support members 56 and 58, also functions to retain the housing sections in operative position and, to adapt the mechanism to this purpose, mounting member 96 is formed with a member 107 extending from the mid portion of transverse section 98 in contiguous relation with member 72 of first support member 56. Member 107 is formed with an elongated hole 108 for receiving a cam 110 mounted on a shaft 112 engaged for rotation in hole 74 in member 72. Shaft 112 extends through an opening in rear portion 32 of the rear housing section and is provided on its outer end with a lever 114 which permits shaft 112 and cam 110 to be rotated manually. It will be apparent from the drawings that rotation of lever 114 and shaft 112 is effective, by virtue of engagement of cam 110 in elongated hole 108, to cause movement of mounting member 96 and roll 82 mounted thereon against the bias of springs 103 away from roll 84 toward transverse wall 64 of first support member 56. The aforementioned latch mechanism includes stub shafts 90 which, in the position of roll 82 when springs 103 are compressed, are located so as to enter slots 80 in side section 76 of second support member 58, and when shaft 112 is rotated so as to permit roll 82 to move toward roll 84 under the bias of springs 103, stub shafts 90 enter the dead end portion of slots 80 where they are engaged to retain the two housing sections in operative position. This construction has the additional advantage of further insuring the proper location of the rolls with respect to one another and, by making one of the rolls a component of the latch, strain on the housing is reduced to a minimum.

Figure 5:
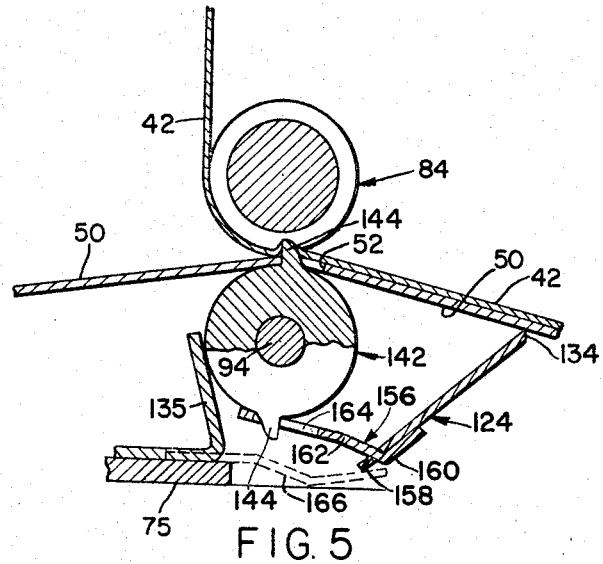
FIGS. 5 and 6 are fragmentary sectional views similar to FIG. 1 illustrating the operation of the device.
Figure 6:
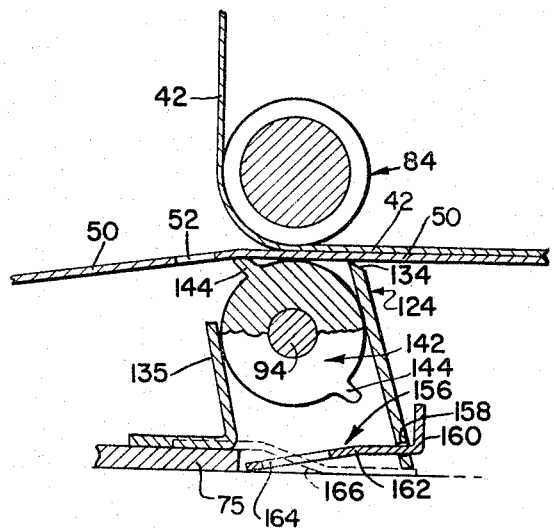

The apparatus includes an indexing mechanism which is an integral portion of the device including the liquid distributing and latching mechanisms. In the form shown in FIG. 2, the indexing means comprise a pair of engagement members 116 each mounted for rotation coaxially with roll 84 at the ends of intermediate section 92 in alignment with grooves 88 and roll 82. Each of engagement members 116 is rotatable independently of roll 82 and is frictionally engaged with the roll so as to be rotated thereby in response to rotation of the roll. Each of engagement members 116 includes a pair of radial projections 118 disposed 180° apart from one another and adapted, when rotated, to project radially beyond the periphery of intermediate section 86 into grooves 88 in roll 82 when the rolls are in juxtaposition in the operative position of the camera housing. In the form shown in detail in FIGS. 5 and 6, each of projections 118 includes a radial face and a sloping face, the latter being adapted to ride against a surface of second sheet 50 during movement of the sheets between rolls 82 and 84. Sheet 50, as previously noted, is provided with D-shaped openings 52 in one or both of its margins and projections 118 are urged by the frictional engagement of roll 84 with engagement members 116 against the surface of sheet 50 where they ride until an opening 52 becomes aligned with a projection 118 permitting the projection to enter the opening in the sheet.

The indexing mechanism includes manually releasable means for preventing rotation of engagement members 116 due to engagement of projections 118 in openings 52 and thereby arrest the movement of the sheets. In the form shown in FIGS. 1 and 2, these last-mentioned means comprise a resilient spring plate 120 mounted on transverse section 75 and including, at its ends, a pair of tabs 122 which extend inwardly toward engagement members 116 into the path of rotation of projections 118 so as to engage a projection 118 on each of engagement members 116, preventing rotation of the engagement member when the other projection thereon is engaged in an opening 52 in sheet 50 between rolls 82 and 84. The indexing means include a cutter bar 124 for deforming spring plate 120 so as to disengage tabs 122 from projections 118 when it is desired to resume movement of the sheets between the pressure-applying rolls. Cutter bar 124 includes a pair of end members 126 at which the cutter bar is pivotally mounted on a pivot pin 128 engaged in openings 130 in side section 76 of second support member 58 adjacent opening 38 at the rear of the camera housing. Cutter bar 124 is pivotable between a first or closed position (shown in FIGURE 6) in which the cutter bar extends across opening 38 closely adjacent or in contact with roll 84 toward the bite of the rolls; and an open position in which the cutter bar extends outwardly from the housing through opening 38 therein. Cutter bar 124 includes a longitudinal edge section 132 between pivot pin 128 and spring plate 120 so constructed and positioned as to move through an arc in engagement with spring plate 120 during pivotal movement of the cutter bar between its first and second positions. In the first, or closed, position of the cutter bar, edge section 132 engages spring plate 120 deforming the spring plate so that tabs 122 are disengaged from projections 118 and are located out of the path of movement of the projections. In the second, or open, position of the cutter bar each section 132 merely engages without deforming spring plate 120 so that tabs 122 are located in the path of movement of projections 118.

To prepare the camera for the operation, a spool 44 of image-recording sheet 42 is loaded into the camera housing between inner end wall 40 and first end portions 20 and 34, and a coil of second sheet 50 is disposed within the housing at the opposite end thereof with a leading end portion of sheet 42 supported on tracks 48 and coupled with leader 54 which projects past roll 84 from the camera housing. The rear housing section is then pivoted to its operative position and lever 114 is rotated to lock the latch mechanism and allow roll 82 to move under the bias of springs 103 toward roll 84 so that the forward and rear housing sections are retained in operative position, and the leader coupled with sheets 42 and 50 is engaged between rolls 82 and 84 and extends from the housing through opening 38. Following loading of the camera, the cutter bar is moved into its closed position (see FIG. 6) to permit leader 54 to be grasped for withdrawing the leader and the leading ends of the sheets between rolls 82 and 84 from the camera housing. The longitudinal edge 134 of the cutter bar opposite longitudinal edge section 132 is sharpened and, in the closed position of the cutter bar, is disposed in engagement with either leader 54 or sheet 50 projecting from between the pressure-applying rolls so that as the leader and/or sheets are manually withdrawn from between the rolls, the cutter bar is pivoted from its closed to its open position (see FIG. 5) thereby allowing an arresting member or members (shown as tabs 122) to move into the path of rotation of radial projections 118 in position to engage the projections and arrest the movement of engagement members 116 and the sheets when a pair of openings 52 become aligned with the projections. Movement of tabs 122 into position to engage projections 118 occurs during initial movement of the sheets so that the projections previously engaged have time to move past the tabs.

The leading end sections of the sheets and each successive sandwich, formed by advancing an exposed section of the image-recording sheet and a corresponding section of the image-receiving sheet together with a container of processing liquid (located between the sheets), between the pressure-applying rolls, are severed from remaining portions of the sheets and sandwich by drawing them against sharpened transverse edge 134 of the cutter bar when the cutter bar is in its open position. The cutter bar may then be pivoted to its closed position in readiness for advancing the next successive sections of the sheets from the housing between the pressure-applying rolls. Openings 52 in sheet 50 are located so as to locate successive predetermined areas of the image-recording sheet in proper position for exposure on tracks 48 and the image-recording sheet is held in position for exposure against the tracks by rear portion 32 of the rear wall of the camera housing. Pivoting the cutter bar into its first or closed position also enables the operator to manually grasp the tab, or leading end section of the sandwich, which was previously provided by tearing the sandwich against the cutter bar while the latter was in its open position. A light seal in the form of a member 135 is secured to transverse section 75 and extends toward roll 82 into close proximity with roll 84 to prevent admission of light between roll 84 and the end of the camera housing.

The camera also includes means for supporting and retaining the coil of image-receiving sheet 50 within the lower portion of the camera housing and, in the form shown, these means comprise members 136 formed as a part of end sections 100, extending inwardly toward one another from the end sections, and members 138 extending from members 136 toward the front of the camera housing. Although members 136 and 138 are mounted on the rear housing section and comprise integral portions of the liquid distributing, indexing and latch device, the image-recording sheet is required to move between members 136 and 138 and the components of the device mounted on the rear housing section. In order to permit loading of the image-recording sheet into the camera so that it may be advanced in this manner, the leading end portion of image-recording sheet 42 is provided with cutouts or recesses 140 in its lateral margins adjacent leader 54 for receiving members 136 and 138 so that when the rear housing section is pivoted into its closed or operative position, members 136 and 138 are able to pass through the cutouts so as to be disposed forward of the image-recording sheet.

An alternative embodiment of the liquid distributing and indexing device of the invention is shown in FIGS. 3 through 6 of the drawings, this device being basically the same as the device shown in FIGS. 1 and 2, with like numerals being used to denote like parts. The basic distinction between this device and the device shown in FIGS. 1 and 2 resides in the construction and operation of the indexing mechanism which includes a single engagement member 142 in the form of a disc adapted to formation of sheet metal, and having two radial projections 144 and an axial hole 146 on which member 142 is rotatably mounted on shaft 94 of roll 84. Disc 142 is biased axially into frictional engagement with the end of intermediate section 92 of roll 84 by a spring 148 coiled around shaft 94 and contained in a cup 150, and is engaged between the intermediate section of the roll and the base of the cup which is disposed against side sections 79 of second support member 58. Cup 150 has an outside diameter approximately equal to the diameter of roll 82 and functions as a light seal to prevent admission of light into the camera through opening 38 around shaft 94 of roll 84. Although the indexing mechanism has been illustrated in FIG. 2 as comprising a pair of engagement members 116, including projections 118 for engaging pairs of openings 52 in sheet 50, the mechanism will operate equally well with only one engagement member 116 or 142 for engaging a succession of openings 52 formed in one side of sheet 50. A pair of engagement members and pairs of openings have been provided as a form of insurance that the indexing mechanism will function properly by engaging at least one hole (of a pair) each time, but are not absolutely necessary for this purpose and for various reasons, including cost, a single engagement member may be preferred.

Cutter bar 124, in the form shown in FIGS. 3 through 6, comprises a substantially planar element having ears 152 projecting from its ends and pivotally engaged in openings 154 in side sections 76 of second support member 58. This mechanism also differs from the mechanism of FIGS. 1 and 2 in the construction of the arresting means for engaging projections 144 to arrest the rotation of engagement member 142 and the movement of the sheets between the rolls. This arresting means, in the form shown, comprises an arresting member 156 engaged for a limited pivotal movement in a slot 158 formed in a section of cutter bar 124. Arresting member 156 includes a first section 160 disposed adjacent one side of cutter bar 124 and a second section 162 extending inwardly into the camera to a position closely adjacent roll 84 and engagement member 142. Second section 162 of arresting member 156 is formed with a slot 164 into which projections 144 extend and the portion of second section 162 defining the end of slot 164 functions to engage projections 144 to arrest the rotation of engagement member 142. Arresting member 156 is bent intermediate its ends where the arresting member extends through slot 158 in cutter bar 124 at such an angle that, when the cutter bar 124 is in an open position, second section 162 is held against roll 84 in position to engage projections 144, and in the closed position of the cutter bar, second section 162 of arresting member 156 is spaced from roll 84 so that engagement member 142 is free to rotate without projections 144 becoming engaged in slot 164 of second section 162. A spring plate 166 similar to spring plate 120 is mounted on transverse section 75 in position to engage the edge of the cutter bar opposite sharpened edge 134 near the end of the cutter bar opposite arresting member 156 for yieldably retaining the cutter bar in its opened and closed positions shown, respectively, in FIGS. 5 and 6.

Among the advantages of the device of FIGS. 3 through 6 are a minimum of components providing for dependable operation and a construction which provides for a reduction in the overall size of the camera housing. In this latter regard, it should be noted that the length of the leader provided, after severing the sandwich, for grasping and withdrawing another section of the sandwich from the camera is dependent upon the radial dimension of the cutter bar, that is, the width of the cutter bar measured radially from its pivotal axis and the position at which the cutter bar is mounted for rotation with respect to the pressure-applying rolls. The longest possible leader is achieved when the cutter bar is widest, however, such a construction requires the cutter bar to be mounted further from the axis of roll 84, since the sharpened edge 134 of the cutter bar should not, in the closed position of the cutter bar, extend more than slightly past a plane tangent with the peripheries of the two rolls, since the cutter bar is required only to frictionally engage the sandwich in its closed position and not deform or bend the sandwich so that it is difficult to grasp manually. Increasing the width of the cutter bar and moving its pivotal axis away from roll 84 would obviously necessitate enlarging the camera housing, whereas the construction shown in FIGS. 3 through 6 provides for the smallest possible cutter bar width and the closest (to roll 84) possible pivotal mounting consistent with providing a minimum length leader, because the cutter bar is not required to deform spring plate 120 to the extent necessary to disengage radial projections 144, as described.

According to the invention shown and described, the liquid distributing and sheet indexing functions of the apparatus are performed by a substantially unitary device characterized by a simple and compact construction which, for the most part, lends itself to fabrication from sheet metals and, accordingly, is quite inexpensive. This unitary device also functions as a latch for retaining the two housing sections together and the forces required to be exerted by mechanisms which distribute the processing liquid and control the advancement of the sheets are taken up by the device and are not transmitted to the camera housing. It is by virtue of the construction of this unitary device that the overall construction of the camera can be simple and inexpensive yet reliable and dependable in its operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including a pair of juxtaposed pressure-applying members for superposing successive exposed portions of a photosensitive sheet with a second sheet and distributing a processing liquid between said sheets to form a sandwich, at least one of said pressure-applying members comprising a roll mounted for rotation about a longitudinal axis, the combination with said pressure-applying members of means for controlling the movement of said sheets between said members and severing successive portions of said sandwich from other portions of said sheets, said means comprising:

an engagement member mounted for rotation coaxially with and independently of said roll adjacent an end thereof;

said engagement member including two radial projections for engaging portions of one of said sheets near a lateral margin of said one sheet and being frictionally engaged with said roll for rotation thereby in response to rotation of said roll;

an arresting member including a section normally disposed in the path of rotation of said projections for engaging one of said projections to arrest rotation of said engagement member and movement of said sheets when one of said portions of said one sheet is engaged by the other of said projections; and a control member engaged with said arresting member and mounted for movement with respect to said pressure-applying members between a first position in which said control member positions said arresting member in said path of movement of said projections and said control member provides means for severing said sandwich at a predetermined location thereon, and a second position in which said control member positions said section of said arresting member out of said path of movement of said radial projections.

2. The photographic apparatus of claim 1 in which said engagement member is generally circular in cross section and said projections are disposed 180° apart from one another.

3. The photographic apparatus of claim 1 in which said control member includes an edge section at least equal in length to the width of said sandwich and is constructed and mounted for engaging said sandwich closely adjacent said pressure-applying members at said second position of said control member and engaging said sandwich a predetermined distance from said pressure-applying members at said first position of said control member; and said control member is manually movably from said first to said second position and is movable from said second to said first position by and in response to engagement of said edge section with said sandwich during withdrawal movement thereof between said pressure-applying members.

4. The photographic apparatus of claim 1 in which said arresting member is mounted on said control member for movement thereby between said first and second portions of said arresting member.

5. The photographic apparatus of claim 1 in which said arresting member comprises a resilient member deformable between positions in and out of the path of rotation of said projections and mounted in engagement with a section of said control member in the path of movement of said section between said first and second positions of said control member for yieldably retaining said control member in said first and second positions thereof.

6. The photographic apparatus of claim 5 in which said roll includes a substantially cylindrical medial section for engaging one of said sheets to distribute said processing liquid between said sheets, said engagement member is mounted on said roll at an end of said medial section, said engagement member includes cylindrical portion having a diameter approximately equal to the diameter of said medial section of said roll and said projections extend radially from said cylindrical portion; and the other of said pressure-applying members includes a medial portion for engaging the other of said sheets and is formed with a recess adjacent an end of said medial portion for receiving said projections.

7. In photographic apparatus for exposing and processing successive areas of a photosensitive image-recording sheet, a device for superposing said areas of said image-recording sheet with successive areas of a second sheet and distributing a processing liquid between said sheets to form a sandwich, controlling the movement of said sheets through said apparatus and severing portions of said sandwich from other portions of said sheets, said device comprising, in combination:

first and second support means;

first and second pressure-applying members mounted in juxtaposition on, respectively, said first and second support means;

at least one of said pressure-applying members comprising a roll mounted for rotation about a longitudinal axis;

resilient means for biasing said pressure-applying members toward one another to apply compressive pressure to said sheets during movement of said sheets in superposition between said members;

an engagement member mounted adjacent an end of said roll for rotation coaxially with said roll and independently thereof;

said engagement member including two radial projections for engaging portions of one of said sheets near a lateral margin of said one sheet, and being frictionally engaged with said roll for rotation in response to rotation of said roll;

an arresting member mounted for movement between a first position in which a section of said arresting member is disposed in the path of movement of said projections for engaging one of said projections to arrest rotation of said engagement member and movement of said one sheet in engagement with the other of said projections, and a second position in which said section of said arresting member is disposed out of said path of movement of said projections and said engagement member is free to rotate; and a control member engaged with said arresting member for moving said arresting member between said first and second positions thereof, said control member being mounted on one of said support means for movement with respect to said pressure-applying members and said support means between a first position at which said arresting member is in said first position thereof and a second position at which said arresting member is in said second position thereof;

said control member in said first position including a portion disposed outside of said housing and being manually engageable for moving said control member into said second position, said portion of said control member in said second position thereof being frictionally engaged with one of said sheets adjacent said pressure-applying members.

8. The photographic apparatus of claim 7 in which said device includes resilient means mounted on one of said support means in engagement with said control member for retaining said control member in said first and second portions thereof.

9. The photographic apparatus of claim 8 in which said arresting member and the last-mentioned resilient means are one and the same member.

10. The photographic apparatus of claim 7 in which said arresting member is mounted on said control member for movement therewith between said first and second positions of said arresting member.

11. The photographic apparatus of claim 10 in which said arresting member is mounted on said control member for limited movement with respect to said control member.

12. The photographic apparatus of claim 7 in which said roll is mounted on said second support means; said control member comprises an elongated plate pivotally mounted at its ends on said second support means for movement about an axis substantially parallel with the axis of rotation of said roll; and said plate has a longitudinal edge located outside of said apparatus at a predetermined distance from said pressure-applying members in said first position of said control member for severing said sandwich at a predetermined location thereon, and located closely adjacent said pressure-applying members in engagement with said one of said sheets in said second position of said control member.

13. The photographic apparatus as defined in claim 7 including a housing formed with an opening through which said sandwich may be withdrawn between said pressure-applying members; said pressure-applying members being mounted within said housing across said opening; and said control member being movable within said opening so as to project, in said first position thereof, through said opening from said housing.

14. The photographic apparatus of claim 7 in which said arresting member comprises a resilient member mounted on one of said support means in engagement with said control member for retaining said control member in said first and second positions thereof and said arresting member includes sections extending into said path of movement of said engagement members; and said control member is movable in engagement with said arresting member for coacting therewith to locate said arresting member in said first and second positions thereof.

15. Photographic apparatus as defined in claim 7 comprising a housing having two relatively movable sections for mounting and enclosing the components of said apparatus, said first support means being mounted on one of said housing sections, said second support means being mounted on the other of said housing sections, and said device including means for retaining said first and second support means and said housing sections in substantially fixed operative relation.

16. Photographic apparatus as defined in claim 15 comprising a housing having two relatively movable sections for mounting and enclosing the components of said apparatus, said first member being mounted on one of said housing sections, said second member being mounted on the other of said housing sections and said device including means for retaining said first and second members in substantially fixed, operative relation.

17. The photographic apparatus of claim 7 in which said first support means include a first member, one of said pressure-applying members being mounted on said first member;

said second support means include a second member and a third member mounted for movement on said second member, the other of said pressure-applying members being mounted on said third member;

said first and second members include mutually engageable portions for retaining said first and second members in substantially fixed position relative to one another; and said resilient means are engaged between said second and third members for biasing said other pressure-applying member toward said one pressure-applying member.

18. The photographic apparatus of claim 17 in which said other pressure-applying member includes portions for engaging said first member to retain said first and second members in operative relation and means are provided mounted on said second member in engagement with said third member for moving said third member against the bias of said resilient means to disengage said portions of said other pressure-applying member from said first member.

19. The photographic apparatus of claim 7 in which said roll includes a substantially cylindrical medial section for engaging one of said sheets to distribute said processing liquid between said sheets, said engagement member is mounted on said roll at an end of said medial section, each of said engagement members includes a cylindrical portion having a diameter approximately equal to the diameter of said medial section of said roll and said projections extend radially from said cylindrical portion; and the other of said pressure-applying members includes a medial portion for engaging the other of said sheets and is formed with a recess adjacent an end of said medial portion for receiving said projections.

20. The photographic apparatus of claim 7 in which said engagement member is generally cylindrical and said projections are disposed 180° apart from one another.

21. The photographic apparatus of claim 7 in which said control member includes an edge section at least equal in length to the width of said sandwich and constructed for engaging said sandwich closely adjacent said pressure-applying members in said second position of said control member and engaging said sandwich at a predetermined distance from said pressure-applying members at said second position of said control member; and said control member is movable from said first to said second position by and in response to engagement of said edge section with said sandwich during withdrawal movement thereof between said pressure-applying members.

22. The photographic apparatus of claim 21 in which said edge section is sharpened to facilitate severance of said sandwich.

23. In photographic apparatus comprising a housing including two relatively movable sections, means for mounting pressure-applying members on different housing sections, retaining said housing sections in operative relation with said members in juxtaposition and biasing said members toward one another, said means comprising, in combination:

first support means mounted on one of said housing sections and supporting one of said pressure-applying members;

second support means mounted on the other of said housing sections and supporting the other of said pressure-applying members in juxtaposition with said one pressure-applying member when said housing sections and said support means are in operative relation;

said first support means including a first support member attached to said one housing section, a second support member mounted on said first support member for movement with respect to said first support member toward and away from said other pressure-applying member when said support means are in operative relation, said one pressure-applying member being mounted on said second support member, and resilient means for urging said second support member and said one pressure-applying member toward said other pressure-applying member into an operative position;

operating means mounted on said first support member for movement in engagement with said second support member for moving said one pressure-applying member against the bias of said resilient means away from said other pressure-applying member into an inoperative position; and engagement means comprising a component of said second support means for engaging said one pressure-applying member in said operative position thereof to retain said first and second support means and said housing sections in operative relation, said one pressure-applying member being movable into said inoperative position from engagement with said engagement means to release said housing sections for movement from operative relation.

24. The photographic apparatus of claim 23 in which said first support member and said second support means include mutually engageable elements for locating said first and second support means with respect to one another in proper operative relation.

25. In photographic apparatus including a pair of juxtaposed pressure-applying members defining a convergent passage between said members through which successive exposed portions of a photosensitive sheet are moved in superposition with a second sheet for distributing a processing liquid between said sheets to form a sandwich, the combination with said pressure-applying members of means for controlling the movement of said sheets through said passage between said members comprising:
an engagement member mounted for rotation about an axis located to one side of said passage and lying in a plane through substantially the narrowest portion of said passage and disposed substantially perpendicular to the direction of movement of said sheets through said passage;
said engagement member including at least one radial projection extending from said one side of said one passage into and across said passage toward the opposite pressure-applying member for engaging portions of one of said sheets near an edge thereof;
means mounted in juxtaposition with said engagement member for supporting said sheets against said engagement member;
means for rotating the said engagement member to move said projection into contact with said one sheet during movement of said sheets through said passage between said members;
arresting means including an arresting member movable into and from the path of movement of a portion of said engagement member for arresting rotation thereof and movement of said sheets when one of said portions of said one sheet is engaged by said projection within said passage; and
manually operable control means coupled with said arresting member for moving the latter into and from said path of movement of said portion of said arresting member to selectively engage and arrest rotation of said engagement member and to release said engagement member for rotation.

26. The photographic apparatus of claim 25 in which said means for supporting said sheets against said engagement member comprising a section of said opposite pressure-applying member and said section of said opposite pressure-applying member includes a recess for receiving the free end of said projection and permitting rotation of said engagement member relative to said pressure-applying members.

27. The photographic apparatus of claim 25 wherein said means for rotating said engagement member include means frictionally engaged with one of said sheets.

28. The photographic apparatus of claim 25 in which said arresting member is mounted for movement into and from the path of movement of said radial projection for engaging said projection to arrest rotation of said engagement member and movement of said sheets.

29. The photographic apparatus of claim 25 in which which said control means include a control member coupled with said arresting member for moving the latter, said control member being movable into and from a position in which said arresting member is located in the path of movement of said portion of said engagement member and a section of said control member is positioned for severing said sandwich along a transverse line predeterminedly spaced from said pressure-applying members.

30. In photographic apparatus including a pair of juxtaposed pressure-applying members for superposing successive exposed areas of a photosensitive sheet with a second sheet and distributing a processing liquid between said sheets to form a sandwich, at least one of said pressure-applying members comprising a roll mounted for rotation about a longitudinal axis, the combination with said pressure-applying members of means for controlling the movement of said sheets between said members comprising:
an engagement member mounted for rotation coaxially with and independently of said roll adjacent an end thereof;
said engagement member including at least one radial projection for engaging portions of one of said sheets near a lateral margin of said one sheet and being frictionally engaged with said roll for rotation thereby in response to rotation of said roll;
arresting means for engaging a portion of said engagement member to arrest rotation thereof and movement of said sheets when one of said portions of said one sheet is engaged by said projection; and
manually operable control means coupled with said arresting means for causing the latter to engage and arrest rotation of said engagement member and to release said engagement member for rotation.

31. The photographic apparatus of claim 30 in which said arresting means include a member mounted for movement into and from the path of movement of said radial projection for engaging said projection to arrest rotation of said engagement member and movement of said sheets.

32. The photographic apparatus of claim 30 wherein said arresting means include an arresting member movable into and from the path of movement of said portion of said engagement member and said control means include a sheet-severing member coupled with said arresting member movable manually from a position in which said sheet-severing member is operative to sever said sandwich along a transverse line spaced a predetermined distance from said pressure-applying members and said arresting member is located in said path of rotation of said portion of said engagement member, to release the latter for rotation.

References Cited
UNITED STATES PATENTS

| | | | |
|---|---|---|---|
| 2,871,777 | 2/1959 | Lothrop et al. | 95—89 |
| 3,165,039 | 1/1965 | Downey | 95—13 |
| 3,249,032 | 5/1966 | Wareham | 95—13 |

NORTON ANSHER, *Primary Examiner.*

FRED L. BRAUN, *Assistant Examiner.*